(12) United States Patent
Mantin (10) Patent No.: US 12,332,943 B2
(45) Date of Patent: Jun. 17, 2025

(54) DATA CLASSIFICATION TECHNOLOGY

(71) Applicant: Imperva, Inc., San Mateo, CA (US)

(72) Inventor: Itsik Mantin, Shoham (IL)

(73) Assignee: Imperva, Inc., San Mateo, CA (US)

( * ) Notice: Subject to any disclaimer, the term of this patent is extended or adjusted under 35 U.S.C. 154(b) by 587 days.

(21) Appl. No.: 17/137,346

(22) Filed: Dec. 29, 2020

(65) Prior Publication Data

US 2022/0207085 A1    Jun. 30, 2022

(51) Int. Cl.
| G06F 16/906 | (2019.01) |
| G06F 16/9032 | (2019.01) |
| G06F 16/9035 | (2019.01) |
| G06N 20/00 | (2019.01) |

(52) U.S. Cl.
CPC ...... *G06F 16/906* (2019.01); *G06F 16/90332* (2019.01); *G06F 16/9035* (2019.01); *G06N 20/00* (2019.01)

(58) Field of Classification Search
CPC ............. G06F 16/906; G06F 16/90332; G06F 16/9035; G06F 18/24; G06N 20/00; G06N 3/08
USPC ......................................................... 707/722
See application file for complete search history.

(56) References Cited

U.S. PATENT DOCUMENTS

| 10,754,998 | B2 * | 8/2020 | Nagpal | G06F 21/6209 |
| 2006/0020595 | A1 * | 1/2006 | Norton | G06F 16/90344 |
| 2007/0183655 | A1 * | 8/2007 | Konig | G06F 18/24323 |
| | | | | 382/224 |
| 2011/0078099 | A1 * | 3/2011 | Weston | G16B 40/20 |
| | | | | 706/12 |
| 2014/0379717 | A1 * | 12/2014 | Urmanov | G06F 18/24133 |
| | | | | 707/738 |
| 2016/0092557 | A1 * | 3/2016 | Stojanovic | G06F 16/248 |
| | | | | 707/723 |
| 2016/0098450 | A1 * | 4/2016 | Tandon | G06F 16/2455 |
| | | | | 707/718 |
| 2017/0004184 | A1 * | 1/2017 | Jain | G06F 16/35 |
| 2018/0232528 | A1 * | 8/2018 | Williamson | G06N 5/025 |
| 2018/0365560 | A1 * | 12/2018 | Qiao | G06F 21/6245 |

(Continued)

OTHER PUBLICATIONS

"Aho-Corasick algorithm," 4 pages, Wikipedia, downloaded from https://en.wikipedia.org/wiki/Aho-Corasick_algorithm on Dec. 29, 2020.

*Primary Examiner* — Pierre M Vital
*Assistant Examiner* — Andrew N Ho (57) ABSTRACT

A method by one or more computing devices to classify data values into data types. The method includes receiving a data value to be classified, determining one or more features of the data value, generating feature information associated with the data value that includes information regarding the determined one or more features of the data value, performing one or more matching operations for the data value, generating match information associated with the data value that includes information regarding results of performing the one or more matching operations for the data value, and providing the feature information associated with the data value and the match information associated with the data value to a content-based data type classifier that is to classify the data value based on analyzing the feature information associated with the data value and the match information associated with the data value.

17 Claims, 4 Drawing Sheets

(56) References Cited

U.S. PATENT DOCUMENTS

2019/0354718 A1* 11/2019 Chandnani .......... G06F 21/6254
2020/0125746 A1* 4/2020 Joshi .................. G06F 21/6245

* cited by examiner

DATA CLASSIFICATION TECHNOLOGY

TECHNICAL FIELD

Embodiments of the invention relate to the field of automated data classification.

BACKGROUND

Sensitive data is any type of data that should be protected from unauthorized disclosure such as transactional data (e.g., credit card numbers, bank account numbers, and social security numbers), personal data (e.g., phone numbers, birth dates, email addresses, home addresses, and medical histories), business-related data (e.g., trade secrets, planning information, and financial/accounting information), and/or governmental data (e.g., top-secret information). Digital systems such as web applications and databases often transmit and store sensitive data in a manner that is not always transparent to the data owner or even to the operator of those digital systems. Thus, there is a need to be able to classify data into data types to be able to determine what types of sensitive data is being stored and/or transmitted.

Data classification is the process of organizing data into relevant categories/types so that it can be used and protected more efficiently. Data classification is particularly important for risk management, compliance, and data security purposes.

Existing approaches for classifying data typically store a copy of the data that is to be classified in permanent storage (e.g., in a database) so that it can be accessed and processed by a data classification system. A drawback of existing approaches is that they expose the data (which may include sensitive data) to the data classification system and possibly to malicious or unauthorized actors (e.g., who have access to the permanent storage in which the data is stored via malicious, unauthorized, or unintended means), thereby reducing the privacy of the data.

BRIEF DESCRIPTION OF THE DRAWINGS

The invention may best be understood by referring to the following description and accompanying drawings that are used to illustrate embodiments of the invention. In the drawings.

DETAILED DESCRIPTION

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to embodiments of the invention. However, such notation should not be taken to mean that these are the only options or optional operations, and/or that blocks with solid borders are not optional in certain embodiments of the invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, and/or switching), and/or provide support for multiple application services (e.g., data, voice, and video).

As mentioned above, existing approaches for classifying data typically store a copy of the data that is to be classified in permanent storage (e.g., in a database) so that it can be accessed and processed by a data classification system. A drawback of existing approaches is that they expose the data (which may include sensitive data) to the data classification system and possibly to malicious or unauthorized actors (e.g., who have access to the permanent storage in which the data is stored via malicious, unauthorized, or unintended means), thereby reducing the privacy of the data.

Embodiments disclosed herein may classify data in a safer manner (that better protect privacy) by generating relevant information about the data that can be used to classify the data and providing the information about the data, but not the data itself, to a data type classifier. The data type classifier may classify the data based on analyzing the information about the data without having access to the data itself. Embodiments better protect the privacy of the data as they do not require storing a copy of the data in permanent storage and do not expose the data itself to the data type classifier.

An embodiment is a method by one or more computing devices to classify data values into data types. The method includes receiving a data value to be classified, determining one or more features of the data value, generating feature information associated with the data value, where the feature information associated with the data value includes information regarding the determined one or more features of the data value, performing one or more matching operations for the data value, generating match information associated with the data value, where the match information associated with the data value includes information regarding results of performing the one or more matching operations for the data value, and providing the feature information associated with the data value and the match information associated with the data value to a content-based data type classifier that is to classify the data value based on analyzing the feature information associated with the data value and the match information associated with the data value. Embodiments are further described herein with reference to the accompanying figures.

Figure 1:
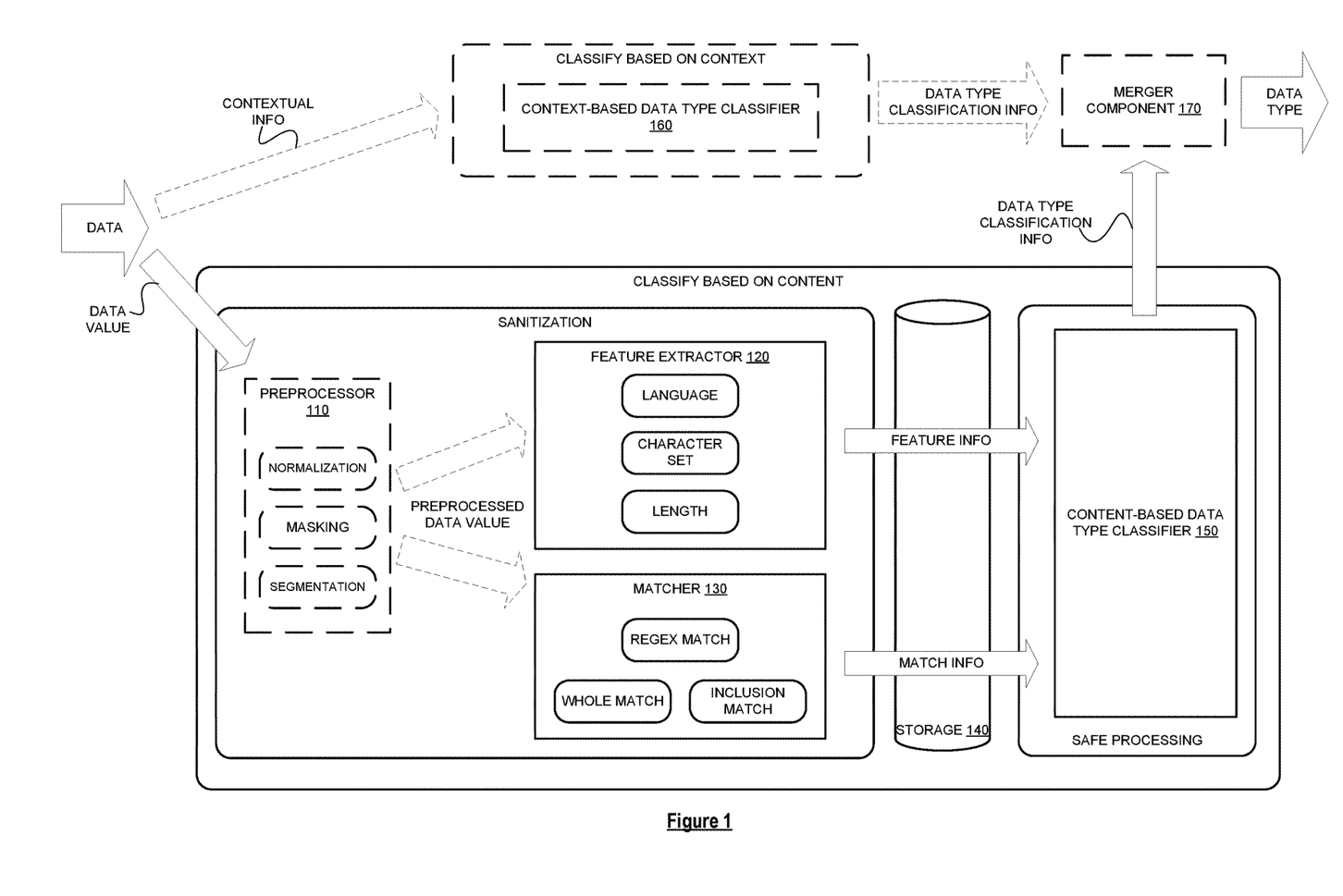
FIG. 1 is a block diagram of a system for classifying data, according to some embodiments.

FIG. 1 is a block diagram of a system for classifying data, according to some embodiments. As shown in the diagram, the system includes a feature extractor 120, a matcher 130, a storage 140, and a content-based data type classifier 150. The system may receive data that is to be classified from one or more data sources. For example, the one or more data sources may include a web application layer proxy (e.g., a web application firewall), a database activity monitoring system, and/or other type of system that monitors or collects data. The system may receive data to be classified in the form of discrete units of data referred to herein as data values. For example, a data value may be the value stored in a particular row and column of a relational database or the value of a key-value pair in a JavaScript Object Notation (JSON) object.

The feature extractor 120 may determine (or "extract") one or more features of data values based on analyzing the data values. A feature of a data value may describe an attribute, property, or characteristic of the data value. For example, the features of a data value may include a language feature, a character set feature, and/or a length feature.

The language feature of a data value may indicate whether the data value is a word (or contains a word) that belongs to a particular language. The feature extractor 120 may determine whether the data value is a word (or contains a word) that belongs to a particular language (or is likely to belong to that particular language) based on analyzing the sequence of characters appearing in the data value using a statistical model of the language. For example, the feature extractor 120 may have or otherwise have access to a statistical model of English words that describes the frequency with which different pairs of characters appear consecutively in English words. The feature extractor 120 may analyze the consecutive pairs of characters appearing in the data value using the statistical model of English words to determine the likelihood that the data value is an English word. For example, if the characters 'f' and 't' appear consecutively in the data value, then the feature extractor 120 may determine from the statistical model of English words that this is a common occurrence in English words (e.g., in the words "after," "soft," "lift," etc.) and thus increases the likelihood that the data value is an English word. However, if the characters 'q' and 'f' appear consecutively in the data value, then the feature extractor 120 may determine from the statistical model that this is a very uncommon occurrence in English words and thus decreases the likelihood that the data value is an English word.

The language feature of a data value may be useful during classification for determining whether a data value is an identifier or not. For example, identifiers typically include sequences of characters that are not commonly found in English words. Thus, if a data value is determined to have a low likelihood of being an English word, then it may have a higher likelihood of being an identifier.

The character set feature of a data value may indicate what types of characters are included in the data value. For example, the character set feature of a data value may include counts of the number of occurrences of different character types in the data value (e.g., the count of the number of occurrences of alphabet characters (and/or counts of the number of occurrences of upper case alphabet characters and lower case alphabet characters, respectively), the count of the number of occurrences of digit characters, the count of the number of occurrences of special characters, the count of the number of base 64 characters). As another example, the character set feature of a data value may include flags (e.g., binary values) for different character types to indicate whether characters belonging to those character types are included in the data value or not (e.g., a flag for alphabet characters may be set to a value of binary '1' if the data value includes at least one alphabet character and otherwise be set to a value of binary '0', a flag for digit characters may be set to a value of binary '1' if the data value includes at least one digit character and otherwise be set to a value of binary '0', and so on).

Data values of certain data types are expected to always have certain characters and/or have a prevalence of certain types of characters. For example, English words are expected to include mostly alphabet characters and spaces, uniform resource locators (URLs) are expected to include colons, forward slashes, and alphabet characters, and email addresses are expected to always include the '@' character. Thus, the character set feature of a data value may be useful during classification for determining the data type of the data value.

The length feature may indicate a length of the data value (e.g., the number of characters included in the data value). Certain data types are expected to have a certain length or to have a length that is within a certain range. For example, Unites States zip codes are expected to have a length of five characters, social security numbers are expected to have a length of nine characters, and usernames/passwords are expected to have a length that is within a predefined allowable range. Thus, the length feature of a data value may be useful during classification for determining the data type of the data value.

It should be understood that the features described above are provided by way of example and that embodiments are not limited to using only these features. Other embodiments may use features that are different from those described above. For example, other features that are relevant for data type classification may include a string encoding feature (e.g., whether UTF-8 encoding is used) and a group/cluster ID feature (e.g., in case some type of grouping/clustering was applied to data values).

Once the feature extractor 120 determines one or more features of a data value, it may generate information regarding these features (which is referred to herein as feature information associated with the data value) and provide this information to the content-based data type classifier 150 (e.g., by storing the information in the storage 140, which is accessible to the content-based data type classifier 150). For example, the feature information associated with the data value may include information regarding the language of the data value (e.g., whether the data value is an English word or the likelihood that the data value is an English word), information regarding the characters used in the data value (e.g., counts of the number of occurrences of different character types or flags indicating the presence of different character types), and/or information regarding the length of the data value (e.g., the number of total characters included in the data value). It should be noted that while the feature extractor 120 may provide information regarding the features of the data value to the content-based data type classifier 150, it does not provide the actual data value itself.

The matcher 130 may perform one or more matching operations for data values. The match operations may include a whole match, an inclusion match, and/or a regular expression match.

The matcher 130 may perform a whole match for a data value by matching the data value against a set of dictionaries to find an exact match. For example, if the set of dictionaries includes a dictionary of colors that includes the dictionary values "red," "blue," and "green," then performing a whole match for the data value "blue" against this dictionary would result in a match with respect to this dictionary (because this data value exactly matches one of the dictionary values). However, performing a whole match for the data values "sky blue," "blues," or "blu" against this dictionary would not result in a match with respect to this dictionary (because these data values do not exactly match one of the dictionary values). The dictionaries against which whole matches are performed may be referred to as whole match dictionaries. When performing a whole match, a dictionary is said to match a data value if the dictionary includes a dictionary value that exactly matches the data value.

The matcher 130 may perform an inclusion match for a data value by matching the data value against a set of dictionaries to find a substring match. For example, the set of dictionaries may include a dictionary of city names that includes the dictionary values "los angeles," "new york," and "chicago." Performing an inclusion match for the data values "new york," "1 rockefeller plaza, new york, ny," or "new york" against this dictionary would all result in a match with respect to this dictionary (because each of these data values includes one of the dictionary values (i.e., "new york") as a substring). The dictionaries against which inclusion matches are performed may be referred to as inclusion match dictionaries. When performing an inclusion match, a dictionary is said to match a data value if the dictionary includes a dictionary value that is included (as a substring) in the data value. In some cases, the same dictionary may be used for performing both whole matches and inclusion matches. In one embodiment, whole matches and/or inclusion matches are performed using a dictionary-matching algorithm such as the Aho-Corasick algorithm.

The matcher 130 may perform a regular expression match for a data value by matching the data value against a set of regular expressions. For example, the set of regular expressions may include a regular expression for detecting email addresses, phone numbers, dates/times, and uniform resource locators (URLs). A regular expression is said to match a data value if the data value conforms to the pattern described by the regular expression.

It should be understood that the matching operations described above are provided by way of example and that embodiments are not limited to performing only these matching operations. Other embodiments may perform matching operations that are different from those described above.

Once the matcher 130 performs matching operations for a data value, it may generate information regarding the results of performing the matching operations (which is referred to herein as match information associated with the data value) and provide this information to the content-based data type classifier 150 (e.g., by storing the information in the storage 140, which is accessible to the content-based data type classifier 150). For example, the match information associated with the data value may include information regarding a result of performing a whole match of the data value against whole match dictionaries (e.g., flags indicating which of the whole match dictionaries matched the data value), information regarding a result of performing an inclusion match of the data value against inclusion match dictionaries (e.g., flags indicating which of the inclusion match dictionaries matched the data value), and information regarding a result of performing a regular expression match (e.g., flags indicating which of the regular expressions matched the data value). It should be noted that while the matcher 130 may provide information regarding the results of performing the match operations for the data value to the content-based data type classifier 150, it does not provide the actual data value itself.

The feature extractor 120 and the matcher 130 can thus be seen as "sanitizing" data values by generating information about the data values that may be useful to the content-based data type classifier 150 for classifying those data values and providing this information to the content-based data type classifier 150 without providing the data values themselves. The feature extractor 120 and the matcher 130 may operate on the data values without storing them in permanent storage by processing the data values in-memory (e.g., in random access memory (RAM)), which better protects the privacy of the data.

In one embodiment, the system includes a preprocessor 110 that preprocesses data values and provides the preprocessed data values to the feature extractor 120 and/or the matcher 130 for processing. The feature extractor 120 and/or the matcher 130 may operate on the original data values and/or the preprocessed data values. Preprocessing the data values may allow for more accurate/efficient feature extraction and/or matching. The preprocessor 110 may preprocess data values by normalizing, masking, and/or segmenting the data values.

The preprocessor 110 may normalize data values to transform different data values having the same meaning or essence into the same format. In one embodiment, the preprocessor 110 normalizes a data value by converting alphabet characters appearing in the data value to lower case, removing extra spaces appearing in the data value, and/or converting special characters appearing in the data value to a predefined character. For example, the data values "new york," "new-york," and "New York" refer to the same thing (the city New York) but are expressed in slightly different forms. The preprocessor 110 may normalize these data values by transforming all of these data values to "new york" (e.g., by converting any alphabet characters to lower case and converting special characters such as the hyphen character to a space character).

The preprocessor 110 may mask data values to hide the original content of the data values. In one embodiment, the preprocessor 110 masks a data value by replacing any digit characters appearing in the data value with a predefined character that represents digit characters (e.g., the '0' character). For example, the preprocessor 110 may mask the data value "1234 1234 1234 1234" (which may be a credit card number) such that it is transformed to "0000 0000 0000 0000".

The preprocessor 110 may segment data values to identify segments (logical subunits of data) within data values. In one embodiment, the preprocessor 110 segments a data value by replacing any sequences of alphanumeric characters (that are uninterrupted by any non-alphanumeric characters) appearing in the data value with a predefined character that represents the segment (e.g., the 'W' character (standing for "word")). For example, the preprocessor 110 may segment the data value "john123@domain.com" such that it is transformed to "W@W.W" (which allows for performing a whole/inclusion match (e.g., for the string "W@W.W") instead of an inefficient regular expression match to detect email addresses).

It should be understood that the preprocessing operations described above are provided by way of example and that embodiments are not limited to performing only these preprocessing operations. Other embodiments may perform preprocessing operations that are different from those described above. In some embodiments, the system does not preprocess data values (thus the preprocessor 110 may be considered as optional).

The content-based data type classifier 150 may access (e.g., from the storage 140) feature information associated with data values (generated by the feature extractor 120) and match information associated with the data values (generated by the matcher 130) and classify the data values into data types based on analyzing the feature information and match information associated with the data values. In one embodiment, the content-based data type classifier 150 is a machine learning system that was previously trained to classify data values into data types based on feature information and match information associated with the data values (e.g., using neural networks). The content-based data type classifier 150 may generate information regarding the results of its data type classification (which is referred to herein as data type classification information generated by the content-based data type classifier 150) and provide this information as output. In one embodiment, the data type classification information generated by the content-based data type classifier 150 includes multiple data types that the content-based data type classifier 150 determined a data value to be potentially classified into and a confidence level/score for each of those data types indicating the confidence level that the data value is of that data type. In other embodiments, the data type classification information generated by the content-based data type classifier 150 only includes the data type having the highest confidence level/score.

Different sets of feature information and/or match information may prove effective to detect different data types. For example, email addresses may be detected effectively using regular expressions and identifiers may be detected effectively using length, character set, and being incompliant with words in the English language. The content-based data type classifier 150 may be provided with the full set of feature information and match information associated with a data value and be able to use the relevant subset of feature information and/or the match information (based on its training) to best classify the data value into data type(s).

The content-based data type classifier 150 can be seen as processing data values in a "safe" manner (that protects privacy) since it operates on information about the data values (e.g., the feature information and match information associated with the data values) as opposed to operating on the actual data values themselves.

In one embodiment, as shown in the diagram, the system includes a context-based data type classifier 160 and a merger component 170. The context-based data type classifier 160 may classify data values based on analyzing contextual information associated with the data values. The contextual information associated with a data value may include information regarding the context in which the data value was stored, generated, and transmitted. For example, the contextual information associated with the data value "John" may be that this data value is from a database table named "user" and more specifically from a column of the database table named "middle name." The context-based data type classifier 160 may classify this data value as likely being a middle name based on analyzing the contextual information. As another example, the contextual information associated with the data value "McDonald" may be that this data value is the value corresponding to a JavaScript Object Notation (JSON) key having key path "user→last name" The context-based data type classifier 160 may classify this data value as likely being a last name based on analyzing the contextual information. In one embodiment, the context-based data type classifier 160 is a machine learning system that was previously trained to classify data values into data types based on contextual information associated with the data values (e.g., using neural networks). In one embodiment, the data type classification information generated by the context-based data type classifier 160 includes multiple data types that the context-based data type classifier 160 determined a data value to be potentially classified into and a confidence level/score for each of those data types indicating the confidence level that the data value is of that data type. In other embodiments, the data type classification information generated by the context-based data type classifier 160 only includes the data type having the highest confidence level/score.

The context-based data type classifier 160 may generate information regarding the results of its data type classification (which is referred to herein as data type classification information generated by the context-based data type classifier 160) and provide this information to the merger component 170. The content-based data type classifier 150 may also provide data type classification information that it generated to the merger component 170. Thus, the merger component 170 may have access to data type classification information generated by both the content-based data type classifier 150 and the context-based data type classifier 160. The merger component 170 may determine the data type of a data value based on analyzing the data type classification information associated with the data value generated by both the content-based data type classifier 150 and the context-based data type classifier 160. "Merging" the data type classification information generated by the different types of data type classifiers in this manner may result in a more accurate data type classification compared to relying on just one type of classification alone.

The data type classification result (the data type that the system determined the data value to be) can be used to determine whether the data value is sensitive data or not. If the data value is determined to be sensitive data then the data value can be masked (e.g., before being further transmitted or stored), reported (e.g., to a security administrator), or further analysis can be performed on the data value (e.g., to confirm that it is actually sensitive data and/or to determine where the data originated from).

A benefit of embodiments disclosed herein is that they allow for classifying data in a manner that better protect the privacy of the data compared to existing data classification systems as they do not require storing a copy of the data in permanent storage and do not expose the data itself to the data type classifier. Other benefits will be apparent to one of ordinary skill in the art in view of this disclosure.

Figure 2:
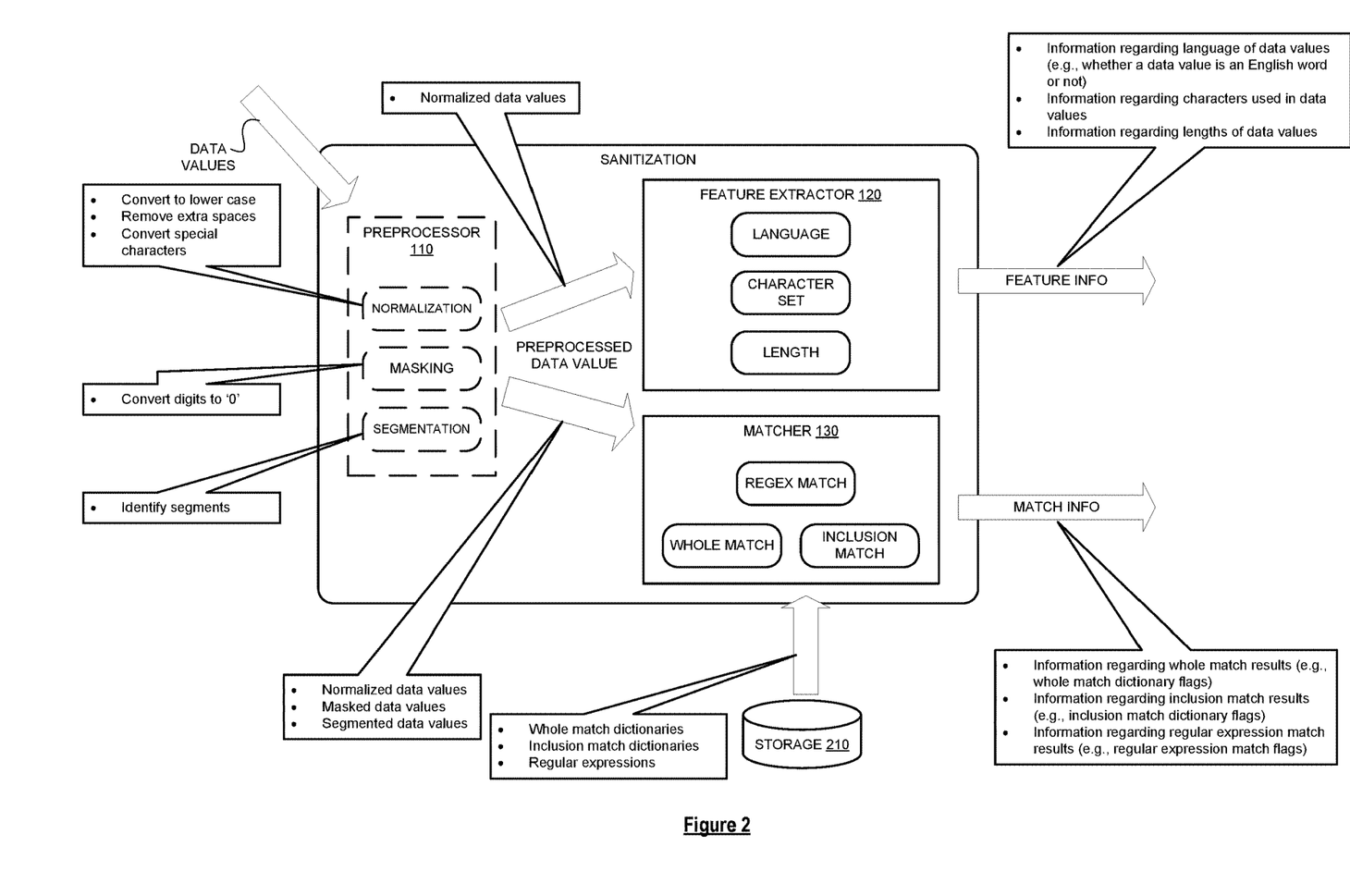
FIG. 2 is a block diagram illustrating data value sanitization, according to some embodiments.

FIG. 2 is a block diagram illustrating data value sanitization, according to some embodiments. As shown in the diagram, the normalization performed by the preprocessor 110 may involve converting alphabet characters to lower case, removing extra spaces, and/or converting special characters to a predefined character. The masking performed by the preprocessor 110 may involve converting digit characters to a predefined character (e.g., converting any digit characters to the '0' character or converting sequences of digit characters with a sequence of characters (e.g., "4580-1111-2222-3333" to "**---**")). The segmentation performed by the preprocessor 110 may involve identifying segments (logical sub-units of data).

Also, as shown in the diagram, the preprocessed data values that the preprocessor 110 provides to the feature extractor 120 may include normalized data values while the preprocessed data values that the preprocessor 110 provides to the matcher 130 may include normalized data values, masked data values, and segmented data values (such preprocessing may improve the accuracy/efficiency of matching).

Also, as shown in the diagram, the matcher 130 may access whole match dictionaries, inclusion match dictionaries, and regular expressions from storage 210. Additional dictionaries, dictionary values, regular expressions, and/or patterns can be added to the storage 210 to improve/augment the data type classification.

As shown in the diagram, the feature information generated by the feature extractor 120 may include information regarding the language of data values (e.g., whether a data value is an English word or not), information regarding the characters used in data values, and lengths of data values. The match information generated by the matcher 130 may include information regarding whole match results (e.g., whole match dictionary flags), information regarding inclusion match results (e.g., inclusion match dictionary flags), and information regarding regular expression match results (e.g., regular expression match flags).

The components of the system may be implemented using one or more computing/network devices. One or more components of the system may be implemented in a cloud (e.g., a cloud provided by a cloud provider such as Amazon®, Microsoft®, etc.) and/or on premise (e.g., in an enterprise network). In an exemplary arrangement, the sanitization-related components (e.g., the preprocessor 110, the feature extractor 120, and the matcher 130) are implemented on-premise (e.g., in an enterprise network close to the data source(s)) while the content-based data type classifier 150 is implemented in the cloud. It should be understood that other arrangements are also possible. For example, all of the components may be implemented in the cloud or on-premise.

Figure 3:
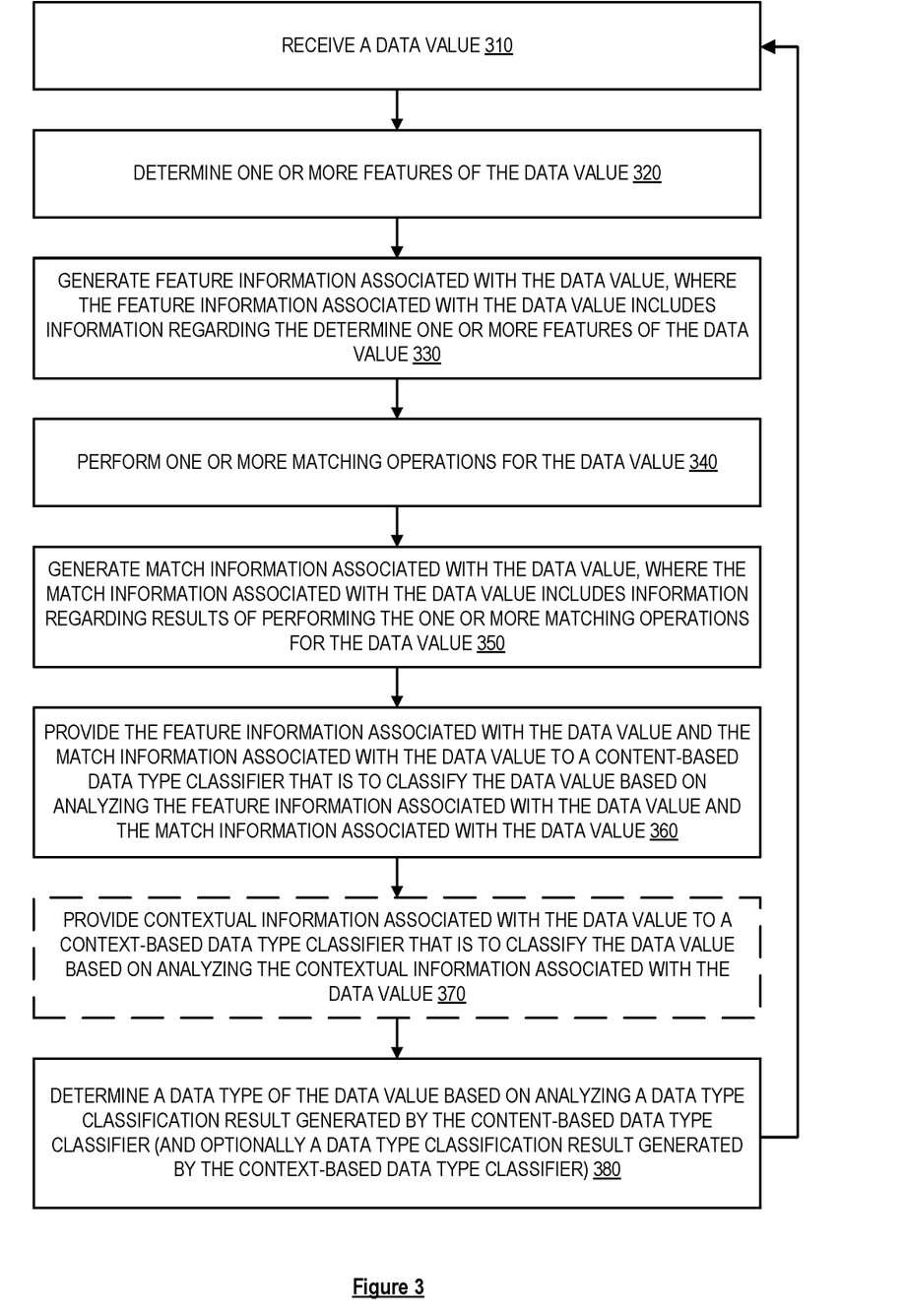
FIG. 3 is a flow diagram of a process for classifying data, according to some embodiments.

FIG. 3 is a flow diagram of a process for classifying data, according to some embodiments. In one embodiment, the process is implemented by one or more computing devices. The process may be implemented using hardware, software, firmware, or any combination thereof.

The operations in the flow diagram are described with reference to the exemplary embodiments of the other diagrams. However, it should be understood that the operations of the flow diagram can be performed by embodiments other than those discussed with reference to these other diagrams, and the embodiments discussed with reference to these other diagrams can perform operations different than those discussed with reference to the flow diagram. Also, while the flow diagram shows a particular order of operations performed by certain embodiments, it should be understood that such order is exemplary (e.g., alternative embodiments may perform the operations in a different order, combine certain operations, overlap certain operations, etc.).

At block 310, the one or more computing devices receive a data value.

At block 320, the one or more computing devices determine one or more features of the data value. In one embodiment, the one or more features of the data value include a language feature, a character set feature, and/or a length feature At block 330, the one or more computing devices generate feature information associated with the data value, where the feature information associated with the data value includes information regarding the determined one or more features of the data value.

At block 340, the one or more computing devices performs one or more matching operations for the data value. In one embodiment, the one or more matching operations for the data value include a whole match against a plurality of whole match dictionaries, an inclusion match against a plurality of inclusion match dictionaries, and/or a regular expression match against one or more regular expressions. In one embodiment, the whole match or the inclusion match is performed using an Aho-Corasick algorithm or other type of dictionary matching algorithm.

At block 350, the one or more computing devices generate match information associated with the data value, where the match information associated with the data value includes information regarding results of performing the one or more matching operations for the data value. In an embodiment where the one or more matching operations for the data value include a whole match against a plurality of whole match dictionaries, an inclusion match against a plurality of inclusion match dictionaries, and/or a regular expression match against one or more regular expressions, the information regarding results of performing the one or more matching operations for the data value may include information regarding which of the plurality of whole match dictionaries matched the data value, information regarding which of the plurality of inclusion match dictionaries matched the data value, and/or information regarding which of the one or more regular expressions matched the data value.

In one embodiment, the one or more computing devices preprocess the data value before determining the one or more features of the data value or performing matching operations for the data value. The one or more computing devices may determine the one or more features of the data value based on analyzing the preprocessed data value and perform the one or more matching operations for the data value using the preprocessed data value. In one embodiment, the preprocessing includes normalizing the data value, masking the data value, and/or segmenting the data value.

At block 360, the one or more computing devices provide the feature information associated with the data value and the match information associated with the data value to a content-based data type classifier that is to classify the data value based on analyzing the feature information associated with the data value and the match information associated with the data value. In one embodiment, the content-based data type classifier is a machine learning system trained to classify data values based on analyzing feature information associated with the data values and match information associated with the data values. In one embodiment, the data value itself is not provided to the content-based data type classifier.

In one embodiment, at block 370, the one or more computing devices provide contextual information associated with the data value to a context-based data type classifier that is to classify the data value based on analyzing the contextual information associated with the data value.

At block 380, the one or more computing devices determines a data type of the data value based on analyzing a data type classification result generated by the content-based data type classifier (and optionally a data type classification result generated by the context-based data type classifier (e.g., if the operation of block 370 is performed)).

The operations of blocks 310-380 may be repeated to receive and classify additional data values.

Figure 4:
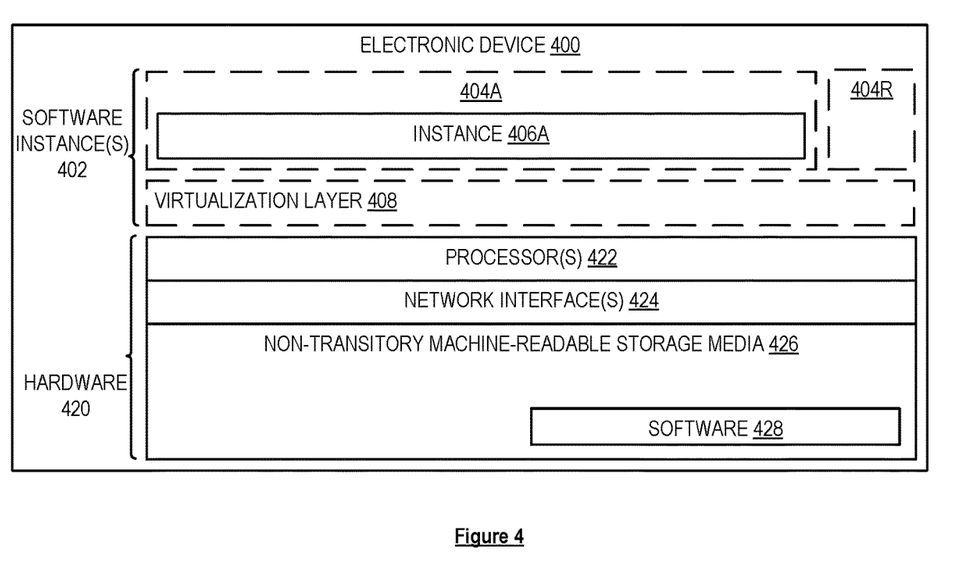
FIG. 4 is a block diagram illustrating an electronic device, according to some embodiments.

FIG. 4 is a block diagram illustrating an electronic device, according to some embodiments. FIG. 4 illustrates hardware 420 comprising a set of one or more processor(s) 422, a set of one or more network interfaces 424 (wireless and/or wired), and non-transitory machine-readable storage medium/media 426 having stored therein software 428 (which includes instructions executable by the set of one or more processor(s) 422). Software 428 can include code, which when executed by hardware 420, causes the electronic device 400 to perform operations of one or more embodiments described herein (e.g., operations for classifying data into data types in a "safe" manner).

In electronic devices that use compute virtualization, the set of one or more processor(s) 422 typically execute software to instantiate a virtualization layer 408 and software container(s) 404A-R (e.g., with operating system-level virtualization, the virtualization layer 408 represents the kernel of an operating system (or a shim executing on a base operating system) that allows for the creation of multiple software containers 404A-R (representing separate user space instances and also called virtualization engines, virtual private servers, or jails) that may each be used to execute a set of one or more applications; with full virtualization, the virtualization layer 408 represents a hypervisor (sometimes referred to as a virtual machine monitor (VMM)) or a hypervisor executing on top of a host operating system, and the software containers 404A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 428 (illustrated as instance 406A) is executed within the software container 404A on the virtualization layer 408. In electronic devices where compute virtualization is not used, the instance 406A on top of a host operating system is executed on the "bare metal" electronic device 400. The instantiation of the instance 406A, as well as the virtualization layer 408 and software containers 404A-R if implemented, are collectively referred to as software instance(s) 402.

Alternative implementations of an electronic device may have numerous variations from that described above. For example, customized hardware and/or accelerators might also be used in an electronic device.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory machine-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware. As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more computing devices to enable a content-based data type classifier that is remote from the one or more computing devices to classify data values into data types, the method comprising:

receiving a data value to be classified:

determining one or more features of the data value;

generating feature information associated with the data value, wherein the feature information associated with the data value includes information regarding the determined one or more features of the data value;

performing one or more matching operations for the data value;

generating match information associated with the data value, wherein the match information associated with the data value includes information regarding results of performing the one or more matching operations for the data value;

providing the feature information associated with the data value and the match information associated with the data value to the content-based data type classifier located in a cloud that is to classify the data value based on analyzing the feature information associated with the data value and the match information associated with the data value without accessing the data value itself, wherein the one or more features of the data value are determined in-memory without storing the data value in permanent storage, the one or more matching operations are performed in-memory without storing the data value in permanent storage, and the data value itself is not provided to the content-based data type classifier; and providing contextual information associated with the data value to a context-based data type classifier that is to classify the data value based on analyzing the contextual information associated with the data value, wherein the contextual information associated with the data value includes information regarding a context in which the data value is stored, generated, and transmitted.

2. The method of claim 1, wherein the content-based data type classifier is a machine learning system trained to classify data values based on analyzing feature information associated with the data values and match information associated with the data values.

3. The method of claim 1, wherein the one or more features of the data value include one or more of: a language feature, a character set feature, and a length feature.

4. The method of claim 1, wherein the one or more matching operations for the data value include one or more of: a whole match against a plurality of whole match dictionaries, an inclusion match against a plurality of inclusion match dictionaries, and a regular expression match against one or more regular expressions.

5. The method of claim 4, wherein the information regarding results of performing the one or more matching operations for the data value includes one or more of: information regarding which of the plurality of whole match dictionaries matched the data value, information regarding which of the plurality of inclusion match dictionaries matched the data value, and information regarding which of the one or more regular expressions matched the data value.

6. The method of claim 4, wherein the whole match or the inclusion match is performed using an Aho-Corasick algorithm.

7. The method of claim 1, further comprising:
preprocessing the data value, wherein the one or more features of the data value are determined based on analyzing the preprocessed data value and the one or more matching operations for the data value are performed using the preprocessed data value.

8. The method of claim 7, wherein the preprocessing includes one or more of: normalizing the data value, masking the data value, and segmenting the data value.

9. The method of claim 1, further comprising:
determining a data type of the data value based on analyzing a data type classification result generated by the content-based data type classifier and a data type classification result generated by the context-based data type classifier.

10. A set of one or more non-transitory machine-readable storage media storing instructions which, when executed by one or more processors of one or more computing devices, causes the one or more computing devices to perform operations for enabling a content-based data type classifier that is remote from the one or more computing devices to classify data values into data types, the operations comprising:
receiving a data value to be classified;
determining one or more features of the data value;
generating feature information associated with the data value, wherein the feature information associated with the data value includes information regarding the determined one or more features of the data value;

performing one or more matching operations for the data value;

generating match information associated with the data value, wherein the match information associated with the data value includes information regarding results of performing the one or more matching operations for the data value;

providing the feature information associated with the data value and the match information associated with the data value to the content-based data type classifier located in a cloud that is to classify the data value based on analyzing the feature information associated with the data value and the match information associated with the data value without accessing the data value itself, wherein the one or more features of the data value are determined in-memory without storing the data value in permanent storage, the one or more matching operations are performed in-memory without storing the data value in permanent storage, and the data value itself is not provided to the content-based data type classifier; and providing contextual information associated with the data value to a context-based data type classifier that is to classify the data value based on analyzing the contextual information associated with the data value, wherein the contextual information associated with the data value includes information regarding a context in which the data value is stored, generated, and transmitted.

11. The set of one or more non-transitory machine-readable storage media of claim 10, wherein the content-based data type classifier is a machine learning system trained to classify data values based on analyzing feature information associated with the data values and match information associated with the data values.

12. The set of one or more non-transitory machine-readable storage media of claim 10, wherein the one or more features of the data value include one or more of: a language feature, a character set feature, and a length feature.

13. The set of one or more non-transitory machine-readable storage media of claim 10, wherein the one or more matching operations for the data value include one or more of: a whole match against a plurality of whole match dictionaries, an inclusion match against a plurality of inclusion match dictionaries, and a regular expression match against one or more regular expressions.

14. A network device configured to enable a content-based data type classifier that is remote from the network device to classify data values into data types, the network device comprising:
one or more processors; and
a non-transitory machine-readable storage medium having instructions stored therein, which when executed by the one or more processors, causes the network device to:
receive a data value to be classified,
determine one or more features of the data value,
generate feature information associated with the data value, wherein the feature information associated with the data value includes information regarding the determined one or more features of the data value, perform one or more matching operations for the data value,
generate match information associated with the data value, wherein the match information associated with the data value includes information regarding results of performing the one or more matching operations for the data value, provide the feature information associated with the data value and the match information associated with the data value to the content-based data type classifier located in a cloud that is to classify the data value based on analyzing the feature information associated with the data value and the match information associated with the data value without accessing the data value itself, wherein the one or more features of the data value are determined in-memory without storing the data value in permanent storage, the one or more matching operations are performed in-memory without storing the data value in permanent storage, and the data value itself is not provided to the content-based data type classifier; and provide contextual information associated with the data value to a context-based data type classifier that is to classify the data value based on analyzing the contextual information associated with the data value, wherein the contextual information associated with the data value includes information regarding a context in which the data value is stored, generated, and transmitted.

15. The network device of claim 14, wherein the content-based data type classifier is a machine learning system trained to classify data values based on analyzing feature information associated with the data values and match information associated with the data values.

16. The network device of claim 14, wherein the one or more features of the data value include one or more of: a language feature, a character set feature, and a length feature.

17. The network device of claim 14, wherein the instructions, which when executed by the one or more processors, further causes the network device to:

determine a data type of the data value based on analyzing a data type classification result generated by the content-based data type classifier and a data type classification result generated by the context-based data type classifier.

* * * * *